J. H. WALTON.
GRAIN AND GRASS-SEED HARVESTERS.

No. 195,424. Patented Sept. 18, 1877.

UNITED STATES PATENT OFFICE.

JOHN H. WALTON, OF GERMANTOWN, KENTUCKY.

IMPROVEMENT IN GRAIN AND GRASS-SEED HARVESTERS.

Specification forming part of Letters Patent No. 195,424, dated September 18, 1877; application filed August 20, 1877.

*To all whom it may concern:*

Be it known that I, JOHN H. WALTON, of Germantown, in the county of Mason and State of Kentucky, have invented a new and Improved Grass-Seed and Grain Stripper; and I do hereby declare that the following is a full, clear, and exact description of the same.

The object of the invention is to effect an improvement in the class of machines designed and adapted for stripping the ripe seed from the standing stalks of grass or grain, and by this mode of harvesting the same enabling the farmer to avoid the labor and expense incurred in the operations of cutting the grass or grain stalks, and subsequently thrashing out the seed.

The invention consists in so attaching the seed box or receptacle to the wheeled frame, and in connecting such mechanism therewith, as will enable it to be adjusted vertically, corresponding to the height of the standing grass or grain, without throwing it out of an approximately-horizontal position.

Figure 1:
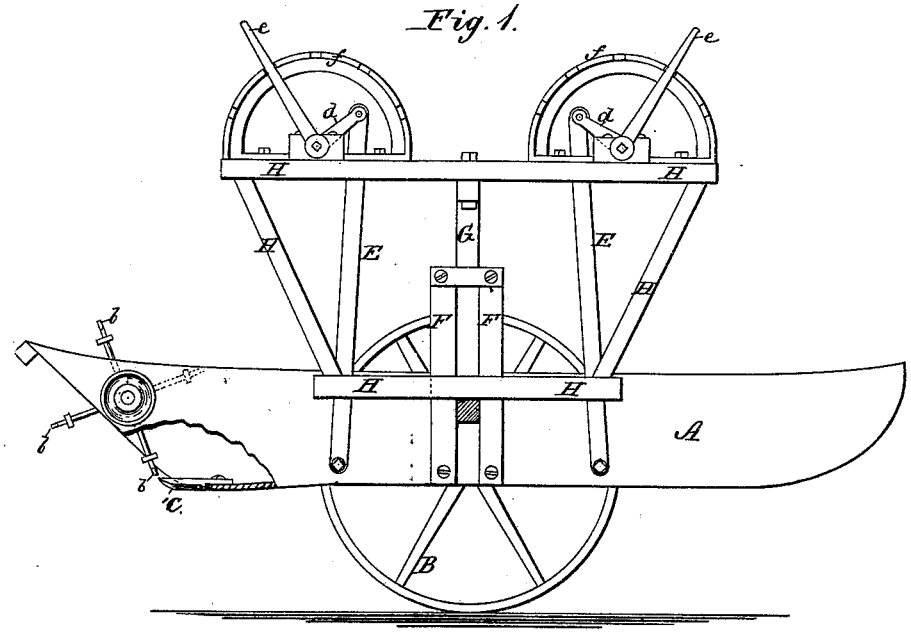
Figure 2:
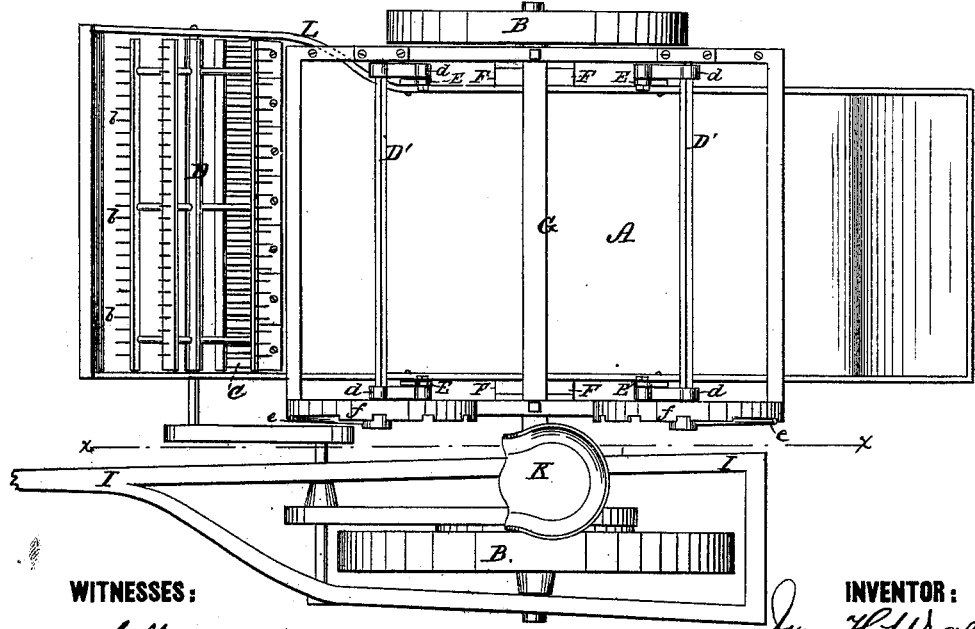

In the accompanying drawings, forming part of this specification, Figure 1 is a sectional elevation of the machine, and Fig. 2 is a plan view.

The box or seed-receptacle A is supported and transported upon wheels B, and provided at its open front end with the stripping-teeth C, which are attached to a bar that is detachably secured to the edge of its floor. The function of these teeth is to receive and hold the grass or grain stalks and remove the seed therefrom as the machine advances. For this purpose they have sharp or angular upper corners, but are beveled on the under side. In practice I attach each tooth to the bar separately, and use different bars with differently-spaced teeth for harvesting grass and grain.

A horizontal reel, D, is located above and slightly in advance of the teeth G, and derives accelerated rotary motion from one of the transporting-wheels, with which it is connected by suitable gears or band and pulley. The horizontal bars affixed to the arms of the reel are provided with short radial teeth $b$, whose points approach near the points of the stripping-teeth C as the reel rotates.

The function of the reel is twofold: first, to comb and straighten the stalks of grass and force them into the spaces between the stripping-teeth C; and, second, to supplement the action of the latter by assisting in removing the seed.

To adapt the machine for operating upon high or low grass or grain, I provide a mechanism for adjusting the seed-receptacle A higher or lower, and for holding it fixed in any adjustment. The same consists, first, of rock-shafts D', provided with arms $d$, which are operated by hand-levers $e$ that lock with rack-bars $f$; and, second, the bars or rods E, which are attached to said arms and pivoted to the sides of box A. The seed-receptacle is guided vertically, when being adjusted, by parallel bars F, attached vertically to its sides, and separated one from the other sufficiently to receive the vertical portion of the bent axle G between them. The rock-shafts are mounted upon the frame H, which is rigidly attached to the journal-arms of the bent axle.

It will be perceived that by operating the rock-shafts D' the box A may be raised or lowered, and will be also guided in such vertical adjustment by the bars F, which then slide in frictional contact with the vertical parts of the axle. The guide-bars F, therefore, preserve the horizontal position of the seed-receptacle A, whatever be its adjustment—that is to say, the floor of the seed-receptacle always remains parallel to the tongue I of the machine, whether adjusted higher or lower. This is important to the end of enabling the operation of bagging the gathered grain to be conveniently and quickly performed by men stationed in the rear end of the seed-receptacle.

The engagement of levers $e$ with the rack-bars holds the seed-receptacle fixed in the position to which it may be adjusted, and these levers are so located as to be conveniently operated by the driver from his seat K.

To prevent the off transporting-wheel running in the standing grain or grass, I construct the adjacent side of the seed-receptacle with a curve or offset, L, which renders the front end of the receptacle wider than the body thereof, and provides what may be termed a "recess," in which to locate the said wheel.

What I claim as new is—

In a grass-seed and grain stripping machine, the seed-receptacle carrying the reel, and having the fixed vertical guide-bars F, the connecting-rods, the rock-shafts, the adjusting and locking levers, and fixed racks, the bent axle, and the frame H, supported upon and rigidly attached to said axle, all combined as shown and described, whereby the seed-receptacle may be adjusted vertically and held locked in any adjustment without changing its relation of parallelism with the tongue, substantially as shown and described.

The above specification of my invention signed by me this 13th day of August, A. D. 1877.

JOHN H. WALTON.

Witnesses:
J. M. FRAZEE,
T. POLLOCK.